(12) United States Patent
Hattori

(10) Patent No.: US 6,557,954 B1
(45) Date of Patent: May 6, 2003

(54) CRAWLER PAD FOR THE TREAD BOARD OF A CRAWLER TRACK SHOE

(76) Inventor: Tomitaro Hattori, 2-772, Oaza Ukita, Miyazaki-shi, Miyazaki-ken (JP)

(*) Notice: Subject to any disclaimer, the term of this patent is extended or adjusted under 35 U.S.C. 154(b) by 0 days.

(21) Appl. No.: 09/806,270

(22) PCT Filed: Sep. 29, 1999

(86) PCT No.: PCT/AU99/00834
§ 371 (c)(1), (2), (4) Date: Jul. 2, 2001

(87) PCT Pub. No.: WO00/18638
PCT Pub. Date: Apr. 6, 2000

(30) Foreign Application Priority Data

Sep. 29, 1998 (JP) .......... 10-290124

(51) Int. Cl.⁷ .......... B62D 55/28
(52) U.S. Cl. .......... 305/189; 305/51; 305/187
(58) Field of Search .......... 305/46, 51, 187, 305/188, 189, 190, 180

(56) References Cited

U.S. PATENT DOCUMENTS

| | | | |
|---|---|---|---|
| 2,869,932 A | * | 1/1959 | Eichweber |
| 4,027,925 A | * | 6/1977 | Black et al. .......... 305/46 |
| 4,105,260 A | * | 8/1978 | Blunier et al. |
| 4,587,280 A | | 5/1986 | Guha et al. |
| 5,769,511 A | * | 6/1998 | Hattori .......... 305/51 |
| RE36,025 E | * | 1/1999 | Suzuki .......... 305/187 |

FOREIGN PATENT DOCUMENTS

| | | |
|---|---|---|
| AU | A-21415/97 | 11/1997 |
| JP | 5-34085 | 2/1993 |
| JP | 5-80984 | 4/1993 |
| JP | 6-47091 | 2/1994 |
| JP | 6-191447 | 9/1994 |
| JP | 8-58647 | 3/1996 |
| JP | 9-136678 | 5/1997 |
| JP | 9-301233 | 11/1997 |
| JP | 10-119842 | 5/1998 |
| WO | WO 97/07011 | 2/1997 |

* cited by examiner

Primary Examiner—Russell D. Stormer
(74) Attorney, Agent, or Firm—Merchant & Gould P.C.

(57) ABSTRACT

A crawler pad to be mounted on the tread board of a crawler track shoe includes an elastic pad body (1) and a metal core (2) buried in the elastic pad body (1). The metal core (2) includes a locking member (4) movably inlaid therein, a fixed hook (6) rigidly secured to its one end, and a detachable hook (5) detachably secured to its other end. The locking member (4) and the detachable hook (5) have ratchet teeth (4a), (5a) on their mutual surfaces which are inclined to permit the detachable hook (5) to slide in its inserting direction and intermesh with one another in its withdrawing direction, thereby allowing the detachable hook (5) to be locked. The detachable hook (5) has preferably a groove (5b) for inserting a releasing pin (9) on its surface where the ratchet teeth are formed. The releasing pin (9) is operable to unlock intermeshing between the ratchet teeth of the locking member and the detachable hook (5).

7 Claims, 7 Drawing Sheets

CRAWLER PAD FOR THE TREAD BOARD OF A CRAWLER TRACK SHOE

BACKGROUND OF THE INVENTION

1. Field of the Invention

This invention relates generally to a crawler pad for the tread board of a crawler track shoe. More specifically, this invention concerns a crawler pad for protecting a road surface from the endless track of a vehicle which carries various machinery for construction, civil and agricultural engineering, etc.

2. Description of the Prior Art

It has been known that a crawler pad is fitted to the tread board of a crawler track shoe to protect the surface of a road from the endless track of a vehicle on which such a machine for construction is mounted. The old crawler pad, on which serious abrasion has occurred due to heavy weight of vehicles and severe onsite operating conditions, needs to be replaced with a new one.

Recently, there have been some proposals to make it easy to replace an old crawler pad with a new one. As a typical example, a crawler pad includes a metal core; a fixed hook rigidly secured to one end of the metal core and a detachable hook detachably secured to the other end of the same. It is necessary that the detachable hook can be easily secured to and detached from the metal core, whenever it is needed. As a conventional means for detachably securing a detachable hook to a metal core, Japanese unexamined patent publication No. 34085/93 and No. 191447/94 disclose that a detachable hook is screwed to a metal core by means of a bolt. Further, it is known to use a lock pin (Japanese unexamined patent publication No. 58647/96) or a slide lock (Japanese unexamined patent publication No. 119847/98) instead of the bolt. However, these securing means such as a bolt, a lock pin and a slide lock are likely to come loose and come off due to violent vibration of long duration.

Also, in the prior art, as an attempt to improve the problem as set forth above, Japanese unexamined patent publication No. 301233/97 has been known. In this invention, a metallic socket includes a hook part for holding a tread board and an inserting part for a rubber pad. The socket is applied to fasten them in such a manner that after inserting the inserting part into the slot of the rubber pad, a bolt is screwed into the holes of the inserting part and the tread board. But, in the case where the bolt is embedded in the rubber pad, it is very difficult to come off the bolt, when the rubber pad is replaced.

There are more complicated means for assembling the rubber pad and the tread board in place as disclosed in Japanese unexamined patent publication No. 136678/97, No. 80984/93 and No. 47091/94. They could not be available in practical use, as they are expensive.

OBJECT OF THE INVENTION

An object of the invention is to provide a simple crawler pad that overcomes the drawbacks as set forth above and enables one to easily replace old crawler pads with new ones by means of a device that permits a detachable hook to be firmly secured to and readily detached from a metal core.

SUMMARY OF THE INVENTION

In order to accomplish the above-mentioned and other objects, a crawler pad for the tread board of a crawler track shoe according to this invention comprises a pad body made of elastic material, a metal core buried in the pad body and is provided with a locking member having ratchet teeth consisting of at least one row of teeth on its one surface, a fixed hook of which one end is rigidly secured to one end portion of the metal core and the other end is adapted to hold the tread board, a detachable hook of which one end surface facing the locking member has ratchet teeth consisting of at least one row of teeth to intermesh with the ratchet teeth of the locking member and the other end is adapted to hold the tread board, the ratchet teeth on the locking member and the detachable hook being inclined to permit the detachable hook to slide in its inserting direction and intermesh with one another in its withdrawing direction, thereby allowing the crawler pad on the tread board to be easily replaced when it is requested.

The locking member preferably has engaging margins protruded from its opposite side edges. It is loosely fitted in an opening of one end portion of the metal core, so as to move upwardly and downwardly to the extent that the engaging margins of the locking member are engaged with the corresponding side edges of the opening. Alternatively, the locking member can be loosely fitted in the opening of a holding plate fixed to the one end portion of the metal core.

It is desirable that the ratchet teeth on the locking member and the detachable hook comprise plural rows of teeth, respectively.

Further, the detachable hook has a groove for inserting a releasing pin on its surface where the ratchet teeth are formed. The releasing pin is operable to unlock intermeshing between the ratchet teeth of the locking member and the detachable hook.

A resilient piece is preferably placed between one end face of the metal core and the corresponding face of the detachable hook to bias the detachable hook in its withdrawing direction.

According to another aspect of this invention, a crawler pad for the tread board of a crawler track shoe comprising a pad body made of elastic material, a metal core buried in the pad body, a holding plate fixed to one end of the metal core, a locking member having ratchet teeth consisting of plural rows of teeth on its one surface and engaging margins protruded from its opposite side edges, the locking member being loosely fitted in the opening of the holding plate so as to move upwardly and downwardly to the extent that the engaging margins of the locking member are engaged with corresponding side edges of the opening, a fixed hook of which one end is rigidly secured to the other end portion of the metal core and the other end is adapted to hold the tread board, a detachable hook of which one end has ratchet teeth consisting of plural rows of teeth on the surface thereof to intermesh with the ratchet teeth of the locking member and the other end is adapted to hold the tread board, having a groove for inserting a releasing pin on its surface where the ratchet teeth are formed, the releasing pin being operable to unlock intermeshing between both ratchet teeth on the locking member and the detachable hook, a resilient piece between one outer end face of the metal core and corresponding face of the detachable hook to bias the detachable hook in its withdrawing direction, the ratchet teeth on the locking member and the detachable hook being inclined to permit the detachable hook to slide in its inserting direction and to intermesh with one another in its withdrawing direction, thereby allowing the crawler pad on the tread board to be easily replaced when it is requested.

DESCRIPTION OF THE PREFERRED EMBODIMENT

This invention will be discussed in detailed in terms of the preferred embodiments with reference to the accompanying drawing.

Figure 1:
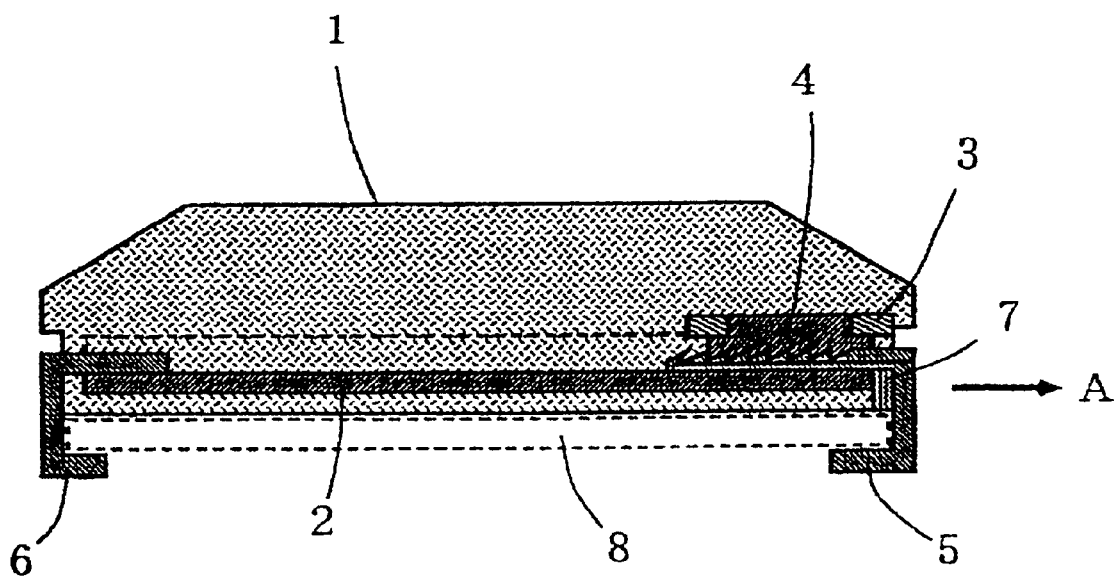
FIG. 1 is a sectional front view showing a preferred embodiment of the crawler pad according to this invention.

In FIG. 1, a pad body 1 made of elastic material such as rubber is molded under heat and pressure so that a metal core 2 is buried therein.

On the one end portion of the metal core 2, a fixed hook 6 is rigidly secured by way of welding, while on the other end portion of the metal core 2, a detachable hook 5 is detachably secured via a locking member 4. It is desirable that a holding plate 3 having an opening 3a is fixed to the one end portion of the metal core 2 where the detachable hook 5 will be set. The locking member 4 has engaging margins 4b protruded from both opposite side edges thereof and is assembled with the metal core 2 via the holding plate 3. For instance, the locking member 4 is loosely fitted in the opening 3a of the holding plate 3 to permit the locking member 4 to move upwardly and downwardly to the extent that the engaging margins 4b are engaged with the corresponding side edges of the opening 3a. In this invention, the locking member 4 and the detachable hook 5 have ratchet teeth 4a and 5a respectively on their mutual surfaces. The ratchet teeth 4a and 5a, each consisting of at least one row of teeth, are inclined to permit the detachable hook 5 to slide in its inserting direction and intermesh with the locking member 4. The detachable hook 5 can be set into a slot of the pad body 1 by hammering. It is preferred that a resilient piece 7 made of rubber and the like is placed between the side end face of the metal core 2 and the detachable hook 6. The resilient piece 7 biases the detachable hook 6 in the direction as indicated by arrow A and makes sure it engages between the ratchet teeth 4a and 4a, after setting the detachable hook 5 in place. The free end of each hook 5 and 6 is bent up to hold a tread board 8.

Figure 2:
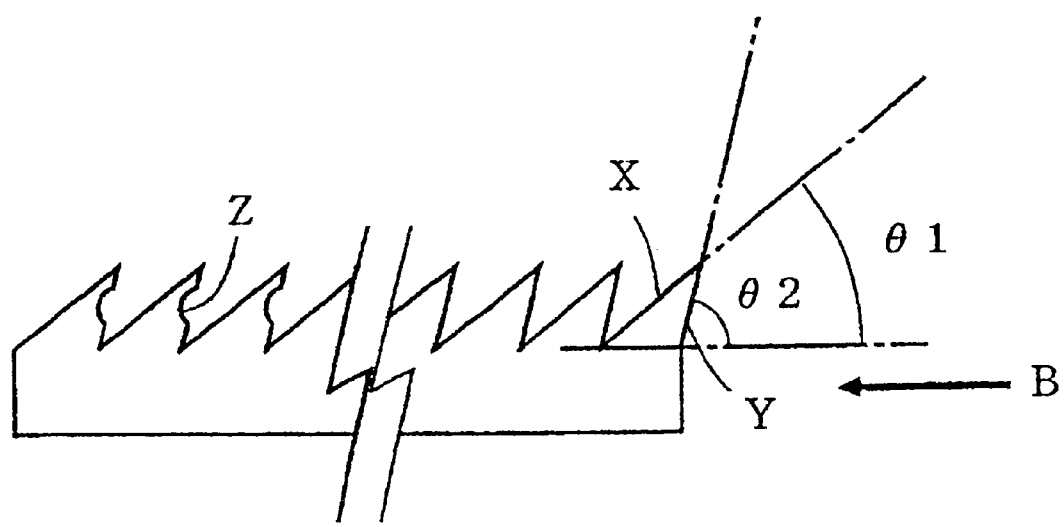
FIG. 2 is an enlarged, fragmentary front view showing ratchet teeth of the detachable hook.
Figure 3:
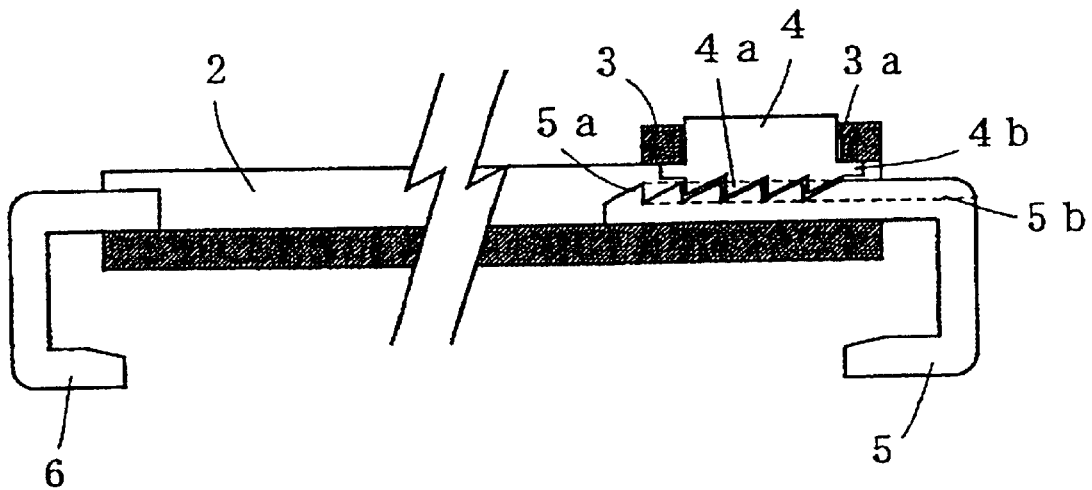
FIG. 3 is a sectional front view showing a preferred engaging mechanism of the detachable hook and the locking member.

In FIG. 2 and FIG. 3, the ratchet teeth 5a of the detachable hook 5 are inclined similarly to the ratchet teeth 4a of the lock member 4 to permit the detachable hook 5 to smoothly slide in the inserting direction as indicated by arrow B in FIG. 2 and lock in the withdrawing direction as indicated by arrow A in FIG. 1. For example, the inclined surfaces X of the ratchet teeth 5a in FIG. 2 make it easy to slide the detachable hook 5 in the inserting direction, while the inclined surfaces Y make sure to lock the detachable hook 5 in the withdrawing direction. The angle θ1 between the inclined surface X and the horizontal line is preferably within the range of 30 to 60 degrees, and is practically at 45 degrees. The angle θ2 between the inclined surface Y and the horizontal line is preferably within the range of 80 to 90 degrees and is practically at 90 degrees. The ratchet teeth should be formed into an upset V shape, but can be formed into a rounded one. In order to obtain more firm engagement between the ratchet teeth 4a and 5a, a recess Z can be disposed on each of the inclined surfaces Y of the ratchet teeth 5, as shown by FIG. 2. In this case, it is needed to provide a protrusion (not shown in any figure) corresponding to the recess Z on the inclined surfaces of the ratchet teeth 4a. The ratchet teeth may consist of one row of teeth, but preferably of plural rows of teeth.

Figure 4:
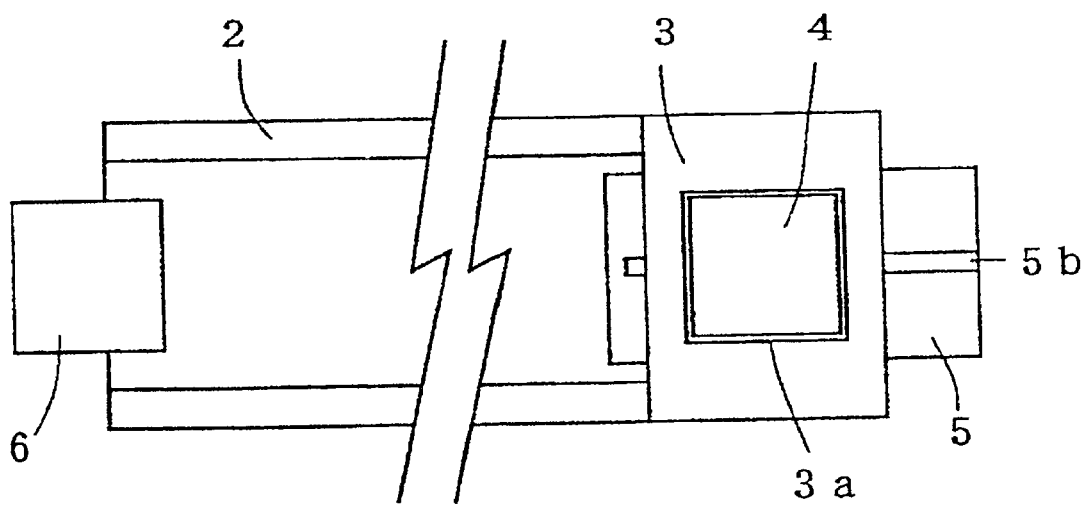
FIG. 4 is a top plane view of FIG. 3.
Figure 5:
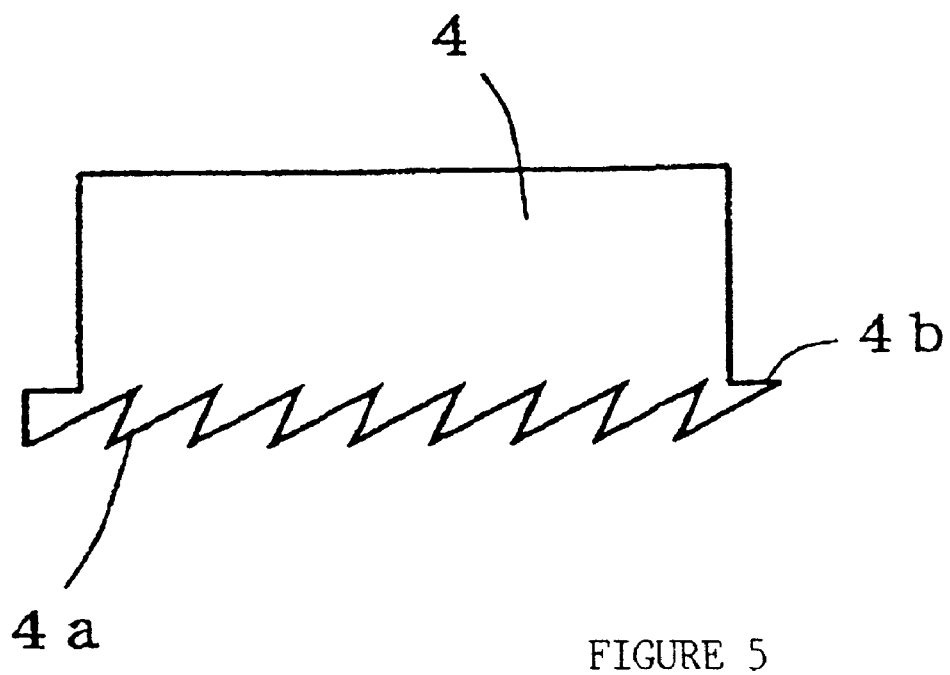
FIG. 5 is an enlarged front view showing the locking member in FIG. 3.
Figure 6:
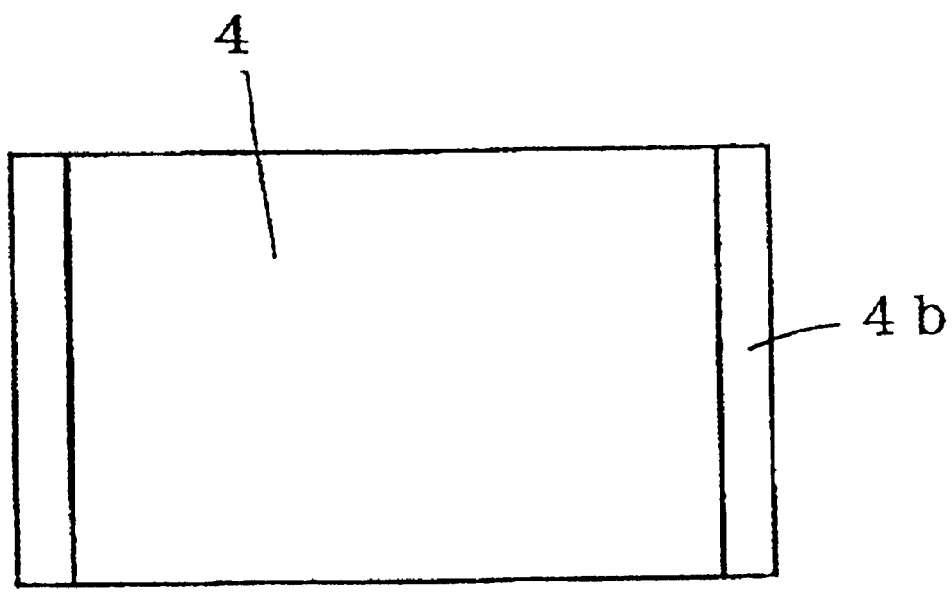
FIG. 6 is a top plane view of FIG. 5.
Figure 7:
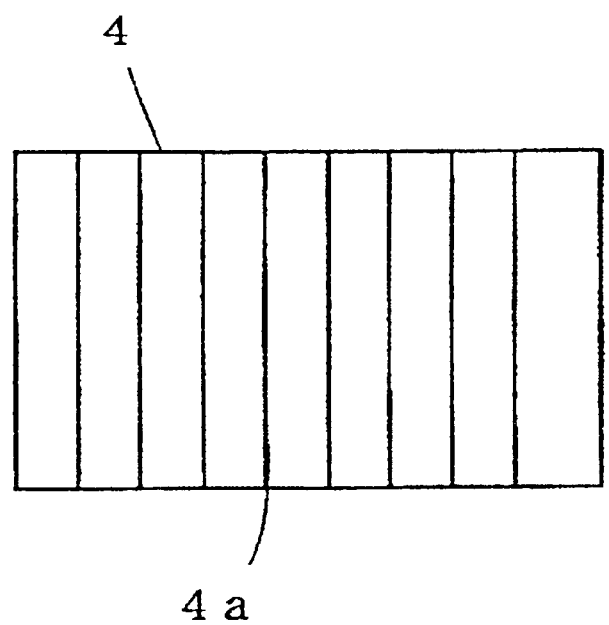
FIG. 7 i's a bottom view of FIG. 5.
Figure 8:
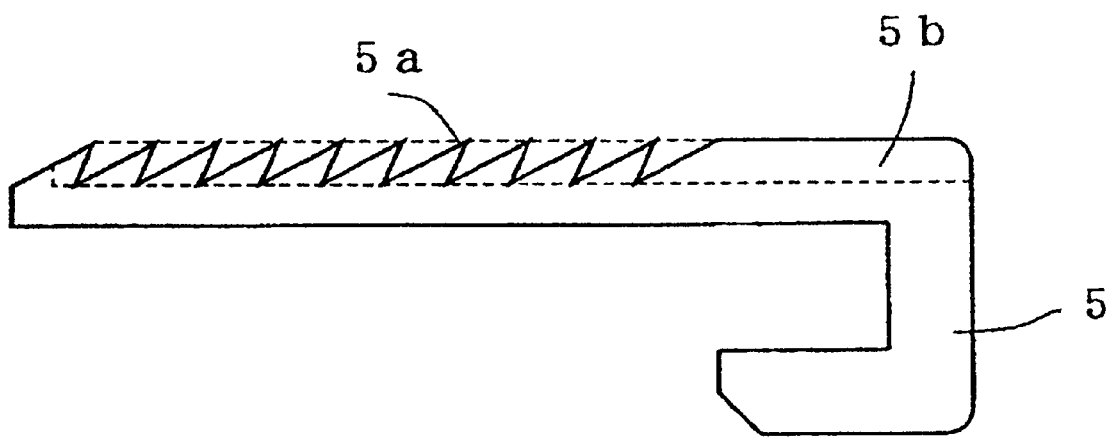
FIG. 8 is a front view showing the detachable hook in FIG. 3.
Figure 9:
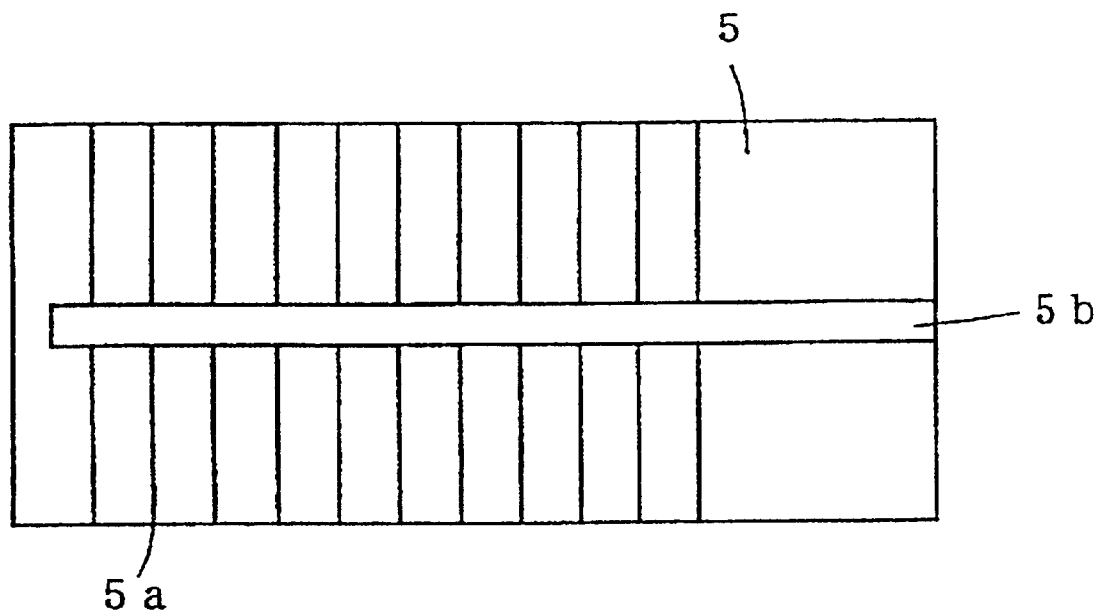
FIG. 9 is a top plane view of FIG. 8.
Figure 10:
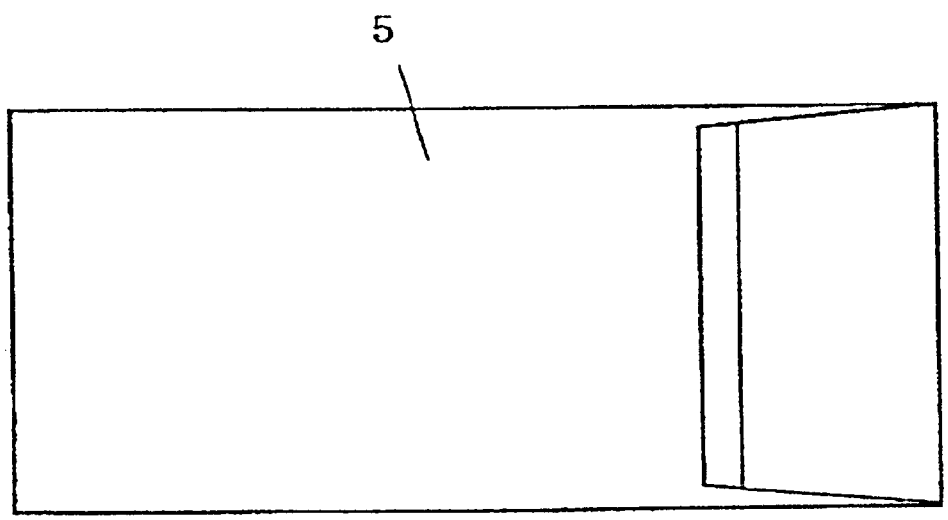
FIG. 10 is a bottom view of FIG. 8.
Figure 11:
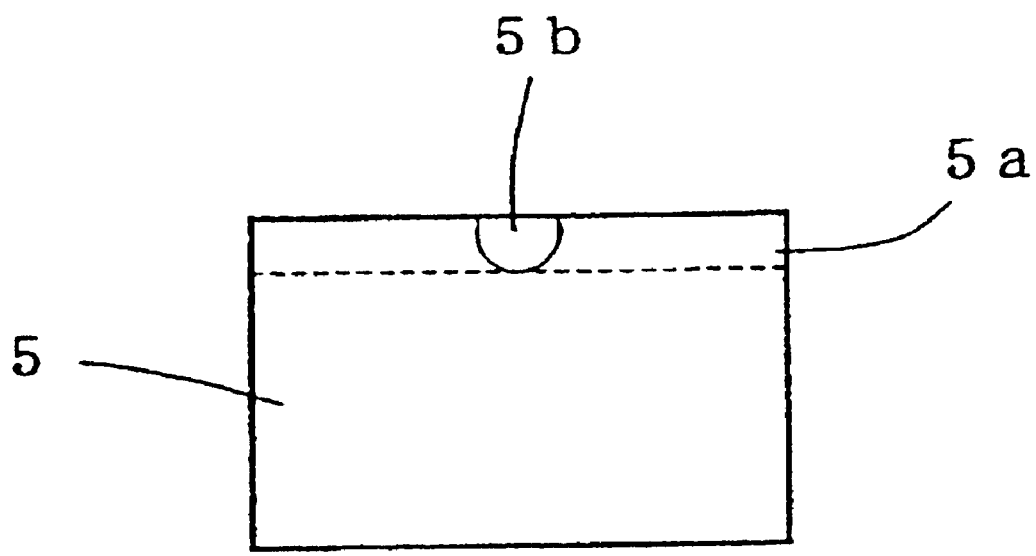
FIG. 11 is a right hand side view of FIG. 8.

In FIG. 3, FIG. 4 and FIG. 5, the metal core 2 having the fixed hook 6 on its one end portion is provided with the holding plate 3 on its other end portion. The holding plate 3 is bored to form an opening 3a that serves as a frame for inlaying the locking member 4. The locking member 4 has an engaging margin protruded from both side edges thereof and the ratchet teeth 4a on its underside surface. The ratchet teeth 4a consist of at least one row of teeth, preferably plural rows of teeth. The locking member 4, of which the upper side surface is bonded to the pad body 1 by an adhesive agent, is loosely fitted in the opening 3a of the holding plate 3 so as to move upwardly and downwardly in reaction to the heavy load which the pad body 1 takes, to the extent that the engaging margins 4b of the locking member 4 is engaged with the corresponding side edges of the opening 3a of the holding plate 3.

As shown in FIG. 1, FIG. 8, FIG. 9, FIG. 10 and FIG. 11, The detachable hook 5 to be engaged with the locking member 4 has ratchet teeth 5a on its upper side surface which faces the ratchet teeth 4a of the locking member 4. The ratchet teeth 5a consist of at least one row of teeth, preferably plural rows of teeth as in the ratchet teeth 4a. In the case where the ratchet teeth 4a and 5a consist of plural rows of teeth, they have advantages of not only obtaining firm engagement, but also being engageable therebetween, even though there are somewhat irregular lengths of the pad body 1, as long as the irregularity in the length is within the range of length of the rack teeth 5a.

Figure 12:
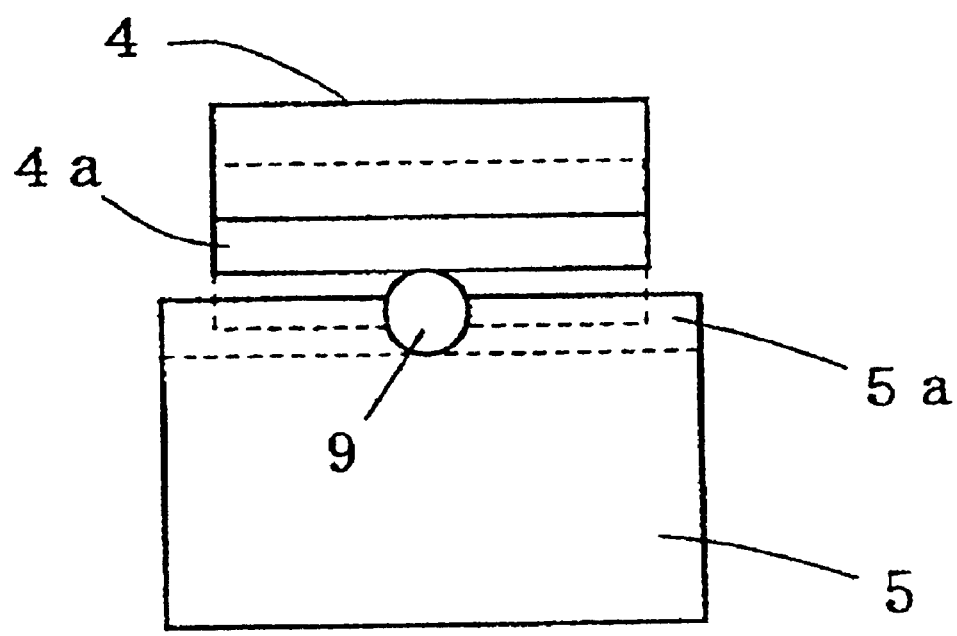
FIG. 12 is a right hand, fragmentary side view showing the state of disengaging between the detachable hook and the locking member by means of a releasing pin.

On the surface of the detachable hook 5 where the ratchet teeth 5b are formed, a groove 5b for inserting a releasing pin 9, resembling a nail is also formed. The releasing pin 9 is operable to disengage between the ratchet teeth 4a and 5b. As shown in FIG. 12, when the releasing pin 9 is hammered into the groove 5b, the locking member 4 set in the opening 3a of the holding plate 3 moves up from the position indicated by the dotted line to the solid line against the resilient force of the pad body 1. Thus the engagement between the ratchet teeth 4a and 5a is disengaged to permit the detachable hook 5 to readily remove.

Figure 13:
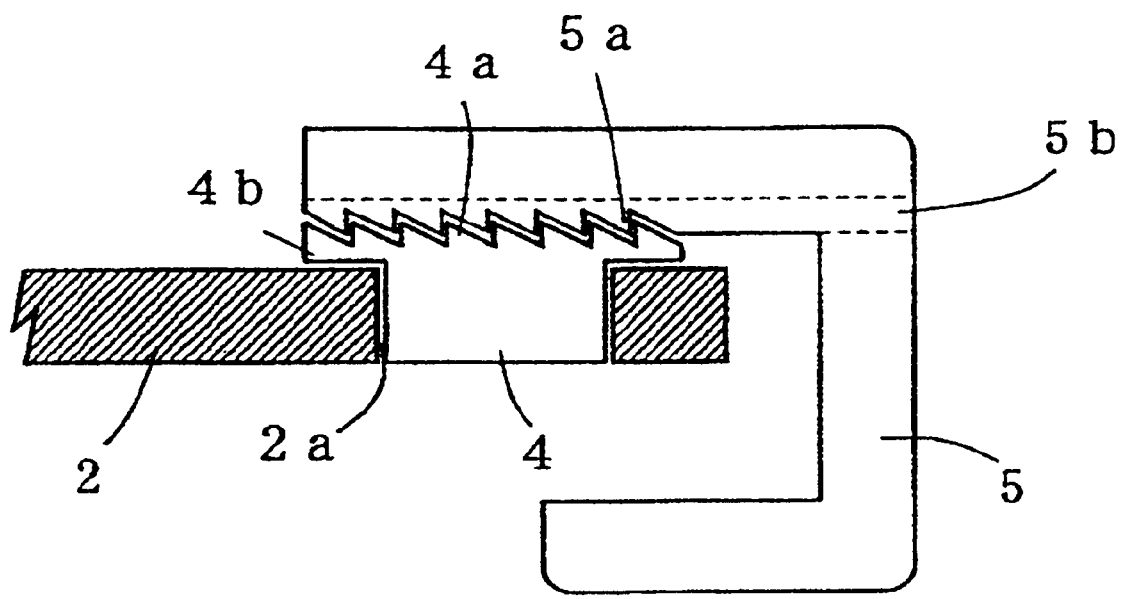
FIG. 13 is a partially sectional, fragmentary front view showing another engaging mechanism between the detachable hook and the locking member.

FIG. 13 indicates another different engaging mechanism between the detachable hook 5 and the locking member 4 from one shown in FIG. 3 and FIG. 4. In this embodiment, ratchet teeth 4a is formed on the upper side surface of locking member 4. The locking member 4 is loosely fitted in an opening 2a bored directly in the end portion of the metal core 2. The locking member 4 has engaging margins 4b protruded from both sides thereof which are engageable with corresponding side edges of the opening 2a of the metal core 2. A detachable hook 5 includes ratchet teeth 5a and a groove 5b on its underside surface. Although the ratchet teeth 5a and the groove 5b can be formed on one of the side surfaces of the detachable hook instead of the upper side surface or the underside surface, it is better that the ratchet teeth 5a and the groove 5b are formed on the upper side face or underside surface of the detachable hook 5 in terms of the sizes and the relative positions of the pad body 1 and the metal core 2.

In the case where the crawler pad is manufactured by using the metal core 2 indicated by FIG. 3 and FIG. 4, first of all the metal core 2 is formed into a U shape in its cross section. Then a fixed hook is welded to its one end portion, and a holding plate 3 with opening 3a is welded to its other end portion. The upper side of the locking member 4 is coated with an adhesive agent. The locking member 4 having the ratchet teeth 4a on its underside surface is loosely fitted in the opening 3a of the holding plate 3 such that the surface where the ratchet teeth 5a are formed faces downwards. In order to prevent the locking member 4 from dislodging and to form a slot in the pad body 1 for inserting the detachable hook 5, a dummy board for the detachable hook 5, which has no ratchet teeth 5a, but similar in size to it, is attached to the underside face of the metal core 2. Finally, rubber is molded into the shape of the pad body 1 as illustrated in FIG. 1 by means of a metallic mold under heat and pressure so as to contain the metal core assembly set forth above therein. After cooling, the dummy board is removed. As the dummy board is being removed, the slot for inserting the detachable hook 5 is formed in the pad body, but the locking member 4 comes off from the holding plate 3, because the locking member 4 is adhered to the pad body 1.

The crawler pad of this invention having structure as set forth above can be surly mounted on and readily removed from the tread board of the endless track shoes of vehicles which are widely used in the field of the construction and the like as follows.

The fixed hook 6 welded on the one end portion of the metal core 2 hooks the tread board 8, while the detachable hook 5 is hammered into the slot of the pad body 1 against the resilient force of both pad body 1 and resilient piece 7 so as to hook the tread board 8. Inserting the detachable hook 5, it pushes up the lock member 4, which is loosely fitted in the opening 3a of the holding plate 3 as shown in FIG. 2. When the detachable hook is set in place, both ratchet teeth 4a and 5a of the lock member 4 and the detachable hook 5 are intermeshed therebetween. At the-same time, the lock member 4 is pushed down and drawn back in an outward direction by co-operation of the pad body 1 and the resilient piece 7, intermeshing between both ratchet teeth 4a and 5a becoming more tight. Thus the crawler pad can be surely mounted on the tread board 8 by the fixed hook 6 and the detachable hook 5.

When a vehicle is driven, the pad body 1 will come in touch with the road surface and the load of the vehicle is exerted on the pad body 1. Accordingly, the pad body 1 is compressed downwards with the load of the vehicle. This, in turn, will cause the locking member 4 to move downwards and lock tightly with the detachable hook 5.

To remove the crawler pad, the releasing pin 9 can be hammered into the groove 5b of the detachable hook 5. The locking member 4, which is loosely set in an opening 3a of the holding plate 3, will be moved up against the resilient force of the pad body 1 from the position indicated by dotted line to the solid line as shown in FIG. 12. Thus, the intermesh between both ratchet teeth 4a and 5a is disengaged, and then the detachable hook 5 can be removed.

After removing the detachable-hook 5, the crawler pad with the fixed hook 6 can also be removed from the tread body 8.

The crawler pad of this invention can be suited for heavy-duty vehicles with endless track widely used in the field of construction, civil and agricultural engineering, etc., and can protect a road surface from the endless track of the vehicles. According to this invention, there are many other advantages as follows.

(1) As means for locking detachable hook to the metal core, the ratchet teeth, instead of a bolt and a hook pin, etc. are used in this invention. As a result, firm locking is obtainable in simple operation. Particularly in the case where the ratchet teeth consist of plural rows of teeth, the locking will not only be enhanced, but the discrepancy in the length of the pad body can also be tolerated.

(2) By allowing the lock member to move freely in the pad body, locking between the ratchet teeth of the lock member and the detachable hook will be reinforced, as the crawler pad comes in touch with the road surface and load is added to the lock member via the pad body. In addition, when the detachable hook is removed, the operation is very simple. Namely, when the release pin is hammered into the slot of the removable hook, the lock member moves up and then the locking of the ratchet teeth is disengaged quite simply.

(3) The resilient piece is preferably placed between the end face of the metal core and a corresponding face of detachable hook acts to bias the detachable hook in a withdrawing direction. After inserting the detachable hook into the slot of the pad body against the resilient force of the resilient piece, the detachable hook set in place is drawn back in outwards by the resilient force of the resilient piece, thereby making the two sets of the ratchet teeth engage even more securely.

What is claimed is:

1. A crawler pad for the tread board of a crawler track shoe comprising;
   a pad body made of elastic material,
   a metal core buried in the pad body and is provided with a locking member including a surface having ratchet teeth consisting of at least one row of teeth disposed on said surface,
   a fixed hook including an end that is rigidly secured to an end portion of the metal core and the other end is adapted to hold the tread board,
   a detachable hook including an end surface facing the locking member, said end surface having ratchet teeth consisting of at least one row of teeth to intermesh with the ratchet teeth of the locking member and the other end of the detachable hook is adapted to hold the tread board,
   the ratchet teeth on the locking member and the detachable hook being inclined to permit the detachable hook to slide in an inserting direction and to intermesh with one another in a withdrawing direction, thereby allowing the crawler pad on the tread board to be easily replaced when it is requested.

2. A crawler pad for the tread board of a crawler track shoe according to claim 1, wherein the locking member including opposite side edges having engaging margins protruding therefrom and the locking member is loosely fitted in an opening disposed at the one end portion of the metal core so as to move upwardly and downwardly to the extent that the engaging margins of the locking member are engaged with corresponding side edges of the opening.

3. A crawler pad for the tread board of a crawler track shoe according to claim 1, wherein the locking member including opposite side edges having engaging margins protruding therefrom and the locking member is loosely fitted in an opening of a holding plate fixed to the end portion of the metal core so as to move upwardly and downwardly to the extent that the engaging margins of the locking member are engaged with corresponding side edges of the opening.

4. A crawler pad for the tread board of a crawler track shoe according to claim 1, wherein the ratchet teeth on the locking member and the detachable hook comprise plural rows of teeth, respectively.

5. A crawler pad for the tread board of a crawler track shoe according to claim 1, wherein the detachable hook has a groove for inserting a releasing pin on the end surface of the detachable ratchet where the teeth are formed, the releasing pin being operable to unlock intermeshing between both ratchet teeth of the locking member and the detachable hook.

6. A crawler pad for the tread board of a crawler track shoe according to claim 1, wherein a resilient piece is placed between one end face of the metal core and a corresponding face of the detachable hook to bias the detachable hook in a withdrawing direction.

7. A crawler pad for the tread board of a crawler track shoe comprising;
   a pad body made of elastic material,
   a metal core buried in the pad body,
   a holding plate fixed to the one end of the metal core,
   a locking member including a surface having ratchet teeth consisting of plural rows of teeth disposed on said surface, the locking member including opposite side edges having engaging margins protruding therefrom, the locking member being loosely fitted in an opening of the holding plate so as to move upwardly and downwardly to the extent that the engaging margins of the locking member are engaged with corresponding side edges of the opening,
   a fixed hook including an end that is rigidly secured to an end portion of the metal core and the other end is adapted to hold the tread board,
   a detachable hook including an end surface having ratchet teeth consisting of plural rows of teeth to intermesh with the ratchet teeth of the locking member and the other end of the detachable hook is adapted to hold the tread board, the detachable hook having a groove for inserting a releasing pin on the end surface where the ratchet teeth are formed, the releasing pin being operable to unlock intermeshing between both ratchet teeth on the locking member and the detachable hook,
   a resilient piece being placed between one outer end face of the metal core and a corresponding face of the detachable hook to bias the detachable hook in a withdrawing direction,
   the ratchet teeth on the locking member and the detachable hook being inclined to permit the detachable hook to slide in an inserting direction and to intermesh with one another in a withdrawing direction, thereby allowing the crawler pad on the tread board to be easily replaced when it is requested.

\* \* \* \* \*